(12) United States Patent
Park

(10) Patent No.: US 8,817,508 B2
(45) Date of Patent: Aug. 26, 2014

(54) BIDIRECTIONAL INVERTER FOR NEW RENEWABLE ENERGY STORAGE SYSTEM

(75) Inventor: Jongho Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1101 days.

(21) Appl. No.: 12/820,005

(22) Filed: Jun. 21, 2010

(65) Prior Publication Data

US 2011/0149626 A1 Jun. 23, 2011

(30) Foreign Application Priority Data

Dec. 17, 2009 (KR) .................. 10-2009-0125896

(51) Int. Cl.
*H02M 3/24* (2006.01)

(52) U.S. Cl.
USPC .......................................... 363/95

(58) Field of Classification Search
USPC ............. 363/34–37, 84, 88, 95, 97, 124, 125, 363/127, 131
See application file for complete search history.

(56) References Cited

U.S. PATENT DOCUMENTS

| | | | |
|---|---|---|---|
| 4,709,318 A | | 11/1987 | Gephart et al. |
| 5,642,254 A | * | 6/1997 | Benwood et al. ............. 361/235 |
| 6,330,170 B1 | * | 12/2001 | Wang et al. ..................... 363/37 |
| 7,566,232 B2 | | 7/2009 | Iida |
| 2003/0038674 A1 | * | 2/2003 | Masuda et al. .................. 330/10 |
| 2004/0119538 A1 | * | 6/2004 | Youn et al. .................... 330/296 |
| 2007/0091947 A1 | | 4/2007 | Park et al. |
| 2008/0074905 A1 | * | 3/2008 | Moiseev et al. ................ 363/20 |
| 2008/0094019 A1 | * | 4/2008 | Steigerwald et al. ......... 318/599 |
| 2008/0116974 A1 | * | 5/2008 | McMorrow .................... 330/251 |
| 2008/0205106 A1 | * | 8/2008 | Nakamura et al. ............. 363/123 |
| 2009/0034300 A1 | | 2/2009 | Ito et al. |
| 2010/0246101 A1 | * | 9/2010 | Deokar et al. ................. 361/601 |
| 2010/0253148 A1 | | 10/2010 | Matsui et al. |

FOREIGN PATENT DOCUMENTS

| | | |
|---|---|---|
| JP | 2009-033800 | 2/2009 |
| KR | 1020000006893 A | 2/2000 |
| KR | 10-2005-0074698 A | 7/2005 |
| KR | 10-2007-0027936 A | 3/2007 |
| WO | WO 2009/072415 A1 | 6/2009 |

OTHER PUBLICATIONS

Wu et al. "Design and Implementation of a Push-Pull Phase-Shifted Bi-directional Inverter with a dsPIC Controller", Nov. 2009, pp. 728-733.*

KIPO Office action dated May 2, 2011 for Korean priority patent application KR 10-2009-0125896.

* cited by examiner

*Primary Examiner* — Adolf Berhane
*Assistant Examiner* — Jeffrey Gblende
(74) *Attorney, Agent, or Firm* — Christie, Parker & Hale, LLP

(57) ABSTRACT

A bidirectional inverter is provided for a renewable energy storage system which may simplify the circuitry and lower manufacturing cost by reducing the numbers of switches and control signals. The bidirectional inverter includes a pulse-width-modulation (PWM) signal provider for providing a PWM signal, a push-pull inverter coupled to the PWM signal provider and a direct current (DC) link, and an offset voltage provider coupled to the push-pull inverter and the electric power system. Accordingly, the bidirectional inverter converts DC power from the DC link into AC power or AC power from the electric power system into DC power.

20 Claims, 6 Drawing Sheets

BIDIRECTIONAL INVERTER FOR NEW RENEWABLE ENERGY STORAGE SYSTEM

CROSS-REFERENCE TO RELATED APPLICATION

This application claims priority to and the benefit of Korean Patent Application No. 10-2009-0125896, filed Dec. 17, 2009 in the Korean Intellectual Property Office, the disclosure of which is incorporated herein by reference.

BACKGROUND

1. Field

Aspects of embodiments of the present invention relate to a bidirectional inverter for an energy storage system.

2. Description of Related Art

In general, a renewable energy storage system, such as a solar cell based system or a wind power generator based system, includes a plurality of converters and a plurality of inverters for storing generated energy in various levels of alternating current (AC) or direct current (DC) power. That is to say, the renewable energy storage system uses a DC-to-AC inverter to convert DC power generated by a solar cell to AC power that is provided to an electric power system. Further, since the power generated by a solar cell has a different power level (e.g., voltage level) from that of a battery, a DC-to-DC converter is used to change the power generated by the solar cell to the power having a voltage level suitably provided to the battery.

SUMMARY

Aspects of embodiments of the present invention provide a bidirectional inverter for a renewable energy storage system with reduced numbers of switches and control signals.

According to an embodiment of the present invention, a bidirectional inverter is provided for a renewable energy storage system capable of providing power from a direct current (DC) link to an electric power system or providing power from the electric power system to the DC link. The bidirectional inverter includes a pulse-width-modulation (PWM) signal provider for providing a PWM signal, a push-pull inverter coupled to the PWM signal provider and the DC link, and an offset voltage provider coupled to the push-pull inverter and the electric power system.

The push-pull inverter may be configured to convert DC power from the DC link into alternating current (AC) power to then provide the AC power to the offset voltage provider.

The PWM signal provider may be configured to provide a PWM signal having a same phase as that of the electric power system.

The push-pull inverter may be configured to convert AC power from the offset voltage provider into DC power to then provide the DC power to the DC link.

The PWM signal provider may be configured to provide a PWM signal having a same phase as that of the electric power system.

The offset voltage provider may be configured to provide an offset voltage to the electric power system, the offset voltage being a sum of a negative offset voltage and an AC voltage from the push-pull inverter.

The negative offset voltage may level-shift the AC voltage from the push-pull inverter in a negative direction by one half of the AC voltage.

The offset voltage provider may be configured to provide an offset voltage to the push-pull inverter, the offset voltage being a sum of a positive offset voltage and an AC voltage from the electric power system.

The positive offset voltage may level-shift the AC voltage from the electric power system in a positive direction by one half of the AC voltage.

In an embodiment of the present invention, the bidirectional inverter may further include a voltage sensor for sensing a voltage of the electric power system and a phase information calculator for sensing a phase information using a voltage obtained from the voltage sensor and providing the phase information to the PWM signal provider.

In an embodiment of the present invention, the push-pull inverter may include a first switch having a first electrode coupled to the DC link, a second electrode coupled to the PWM signal provider, and a third electrode, a second switch having a first electrode coupled to the third electrode of the first switch, a second electrode coupled to the PWM signal provider, and a third electrode coupled to a ground terminal, an inductor having a first electrode coupled to the third electrode of the first switch and the first electrode of the second switch, and a second electrode coupled to the offset voltage provider, and a capacitor coupled between the third electrode of the second switch and the second electrode of the inductor.

Here, the first switch may include an N-channel field-effect transistor (FET), and the second switch may include a P-channel FET.

The offset voltage provider may include a first offset voltage provider for supplying power from the push-pull inverter to the electric power system as a first offset voltage, and a second offset voltage provider for supplying power from the electric power system to the push-pull inverter as a second offset voltage.

In an embodiment of the present invention, the first offset voltage provider may include a first offset switch coupled to the push-pull inverter, and a first adder coupled between the first offset switch and the electric power system, the first adder for providing the first offset voltage to the electric power system by adding a negative offset voltage to a voltage supplied from the push-pull inverter.

In an embodiment of the present invention, the second offset voltage provider may include a second offset switch coupled to the electric power system, and a second adder coupled between the second offset switch and the push-pull inverter, the second adder being for providing the second offset voltage to the push-pull inverter by adding a positive offset voltage to a voltage supplied from the electric power system.

A bidirectional inverter for a renewable energy storage system according to the above described embodiments of the present invention has reduced numbers of switches and control signals, thereby lowering the manufacturing cost and simplifying the circuitry.

Additional aspects and/or features of the invention will be set forth in the description which follows.

BRIEF DESCRIPTION OF THE DRAWINGS

These and/or other aspects and features of the present invention will become apparent and more readily appreciated from the following description of exemplary embodiments, taken in conjunction with the accompanying drawings of which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey embodiments of the invention to those skilled in the art.

Throughout the specification, like numerals refer to like elements. It will be understood that when an element is referred to as being "electrically connected to" another element, it may be directly connected to the other element, or intervening elements may also be present therebetween.

Figure 1:
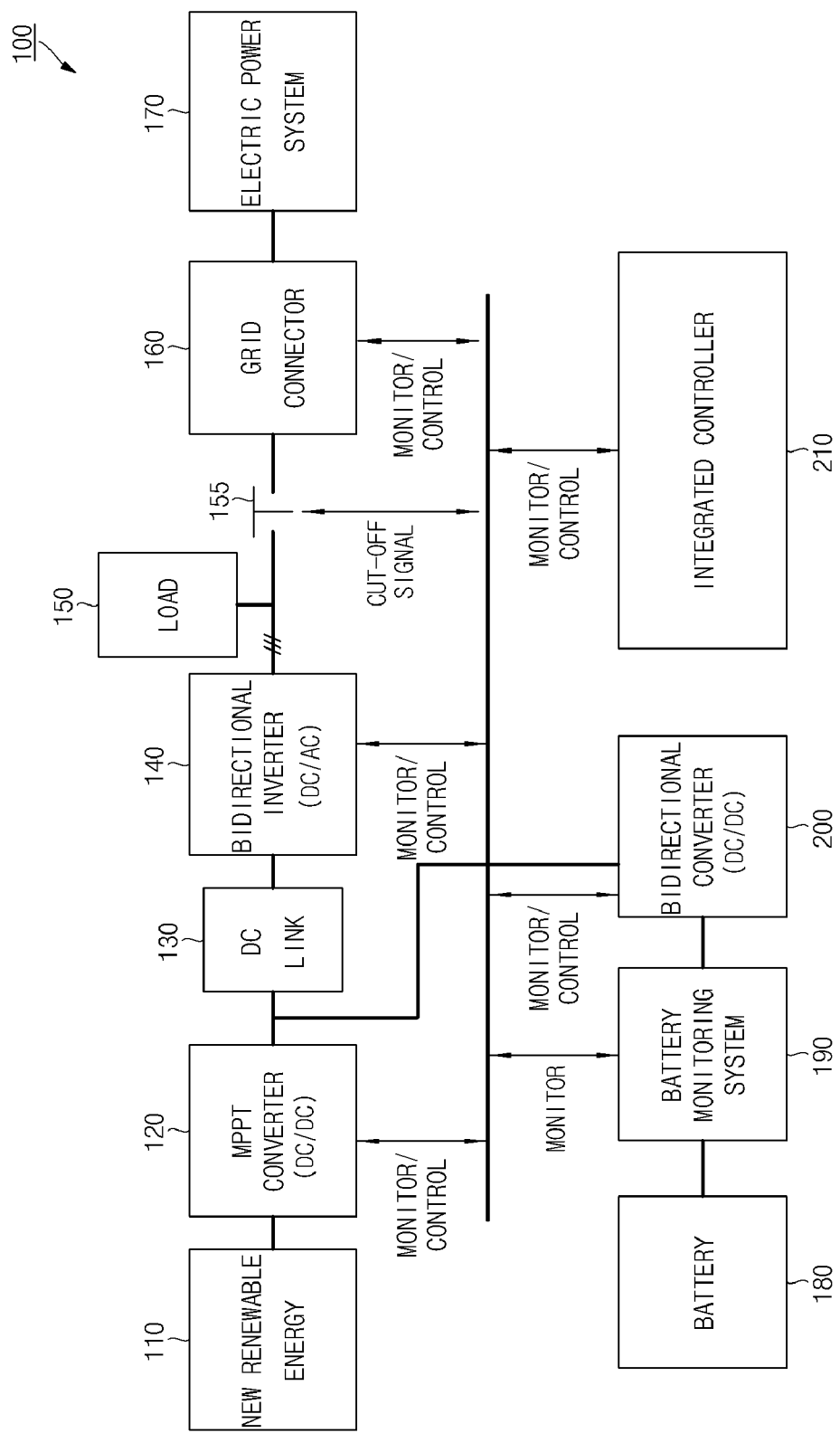
FIG. 1 is a schematic block diagram of a new renewable energy storage system according to an embodiment of the present invention.

Referring to FIG. 1, the renewable energy storage system 100 according to one embodiment includes a renewable energy 110, a Maximum Power Point Tracking (MPPT) converter 120, a Direct Current (DC) link, a bidirectional inverter 140, a load 150, a grid connector 160, an electric power system 170, a battery 180, a battery monitoring system 190, a bidirectional converter 200, and an integrated controller 210.

The renewable energy 110 refers to energy generated from various renewable energy sources of power such as, without limitation, sunlight, wind, water, and geothermal heat. In some embodiments, the renewable energy 110 is an electrical energy produced by a wind generator, a photovoltaic (PV) generator, a wind power generator, or equivalents thereof. In the following, the renewable energy 110 is described with regard to a solar cell as an example.

The MPPT converter 120 extracts the maximum power from the renewable energy 110 and converts it into a different level of an output DC power. The output of the solar cell varies nonlinearly with respect to the amount of solar radiation and surface temperature, which is the main cause of degradation in power generation efficiency of the solar cell. The MPPT converter 120 makes the solar cell operate at a maximum power point. The maximum power point of the solar cell varies nonlinearly with respect to the amount of solar radiation and surface temperature. DC power extracted at the maximum power point is converted into a different level of DC power and provided to the DC link 130.

The DC link 130 temporarily stores a DC voltage supplied from the MPPT converter 120. The DC link 130 may be a substantial high capacity capacitor or other suitable devices. Thus, the DC link 130 removes an alternating current (AC) component from the DC power output from the MPPT converter 120 and stores stable DC power. The DC link 130 also stabilizes and temporarily stores a DC voltage supplied from the bidirectional inverter 140 or the bidirectional converter 200, which will be described in detail later.

The bidirectional inverter 140 converts the DC power provided by the DC link 130 into AC power (e.g., commercial AC power) and outputs the AC power. More specifically, the bidirectional inverter 140 converts a DC voltage from the renewable energy 110 or the battery 180 into AC power that is suitable for home use. The bidirectional inverter 140 also converts AC power (e.g., commercial AC power) provided by the electric power system 170 into DC power and feeds the DC power into the DC link 130. The power stored in the DC link 130 is provided to the battery 180 through the bidirectional converter 200.

The load 150 may be residential or industrial facility using AC voltage (e.g., commercial AC voltage). The load 150 receives AC power sourced from the renewable energy 110, the battery 180, or the electric power system 170.

The grid connector 160 connects the bidirectional inverter 140 to the electric power system 170. More specifically, the grid connector 160 adjusts the range of voltage variations and suppresses harmonic frequencies. The grid connector 160 also provides AC power from which a DC component has been removed to the electric power system 170, or AC power output from the electric power system 170 to the bidirectional inverter 140.

The electric power system 170 may be an electric company or an AC power system provided by an electricity generating company. For example, the electric power system 170 may include power plants, substations, and transmission lines electrically interconnected over a wide area. The electric power system 170 is commonly referred to as a "grid."

The battery 180 may be a secondary battery capable of charging and discharging. The battery 180 may be, for example, a lithium-ion (Li-ion) battery, a lithium polymer (Li-poly) battery or equivalents thereof, but aspects of the present invention are not limited thereto.

The battery monitoring system 190 maintains and manages the battery 180 to be in an optimal state. More specifically, the battery monitoring system 190 monitors the voltage, current and temperature of the battery 180 and warns a user upon detection of a failure. Further, the battery monitoring system 190 calculates the State of Charge (SOC) and State of Health (SOH) of the battery 180, performs cell balancing to equalize voltages or capacities of battery cells constituting the battery 180, and controls a cooling fan to prevent overheating of the battery 180.

The bidirectional converter 200 converts DC power from the DC link 130 into a different level of DC power suitable for charging the battery 180. On the other hand, the bidirectional converter 200 converts DC power from the battery 180 into a different level of DC power suitable for use in the DC link 130. The bidirectional converter 200 may have a unitary structure. In addition, the bidirectional converter 200 may be an insulation-type or a non-insulation type.

The integrated controller 210 monitors and controls the MPPT converter 120, the bidirectional inverter 140, the grid connector 160, and the bidirectional converter 200. The integrated controller 210 also communicates with the battery monitoring system 190 to monitor the battery monitoring system 190. The integrated controller 210 controls the MPPT converter 120, the bidirectional inverter 140, the grid connector 160, and the bidirectional converter 200 by sensing their voltages, currents, and temperatures. Further, the integrated controller 210 controls an interceptor 155 located between the load 150 and the grid connector 160 to cut off the connection in the event of an emergency.

Figure 2:
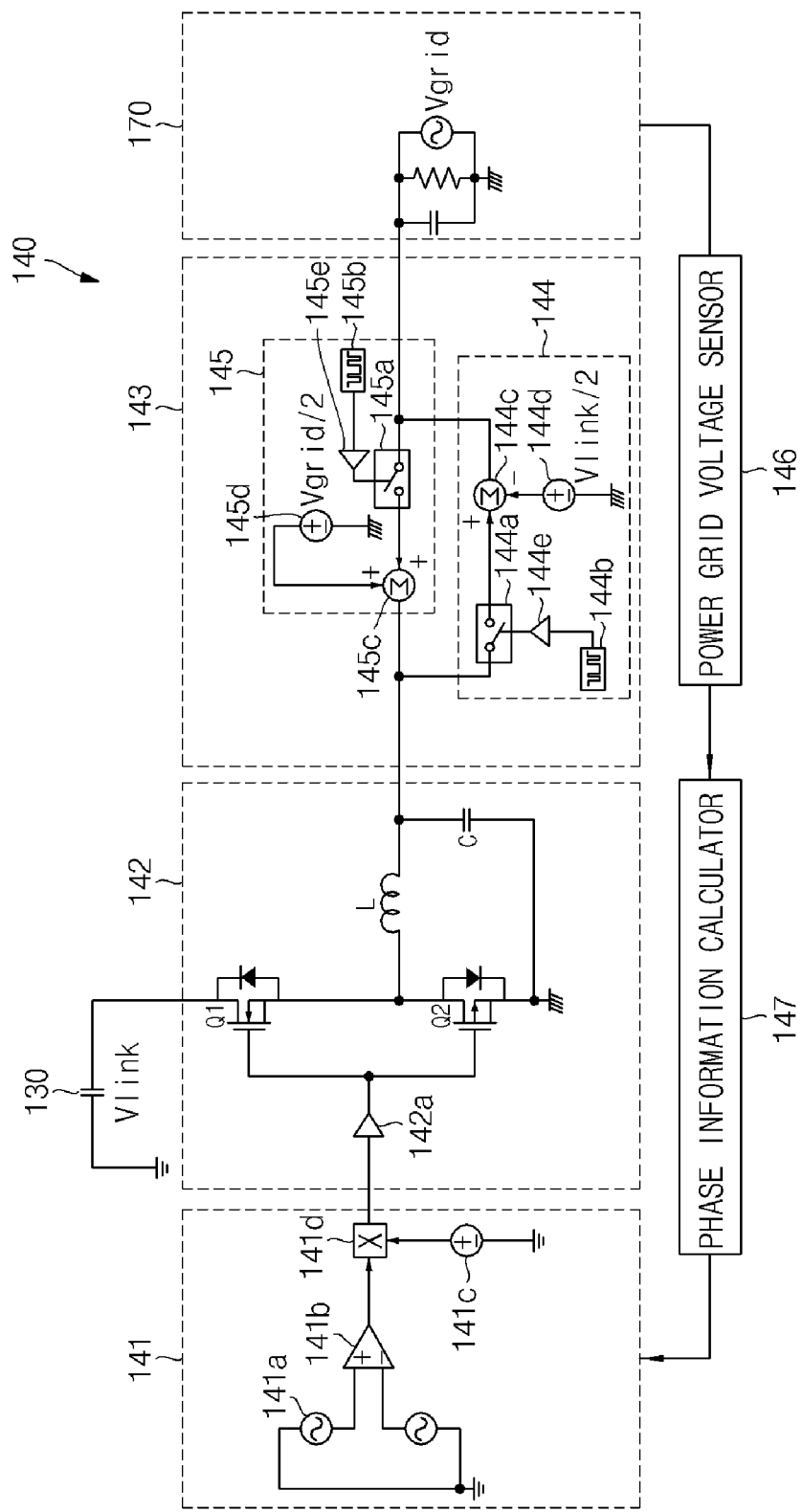
FIG. 2 is a block diagram of a bidirectional inverter for a new renewable energy storage system according to an embodiment of the present invention.

FIG. 2 is a block diagram of a bidirectional inverter 140 for a renewable energy storage system according to an embodiment of the present invention.

Referring to FIG. 2, the bidirectional inverter 140 for a renewable energy storage system according to one embodiment includes a pulse-width-modulation (PWM) signal provider 141, a push-pull inverter 142, and an offset voltage provider 143. The bidirectional inverter 140 further includes a power grid voltage sensor 146 and a phase information calculator 147. The bidirectional inverter 140 converts DC power from a DC link 130 into AC power to provide to an electric power system 170 or converts AC power from the electric power system 170 into DC power to provide to the DC link 130. Here, the DC link 130 and the electric power system 170 are substantially the same as those shown in FIG. 1.

The PWM signal provider 141 provides a PWM signal to the push-pull inverter 142. The PWM signal provider 141 includes at least one waveform generator 141a, a comparator 141b, and an amplifier having a power supply 141c. The PWM signal provider 141 is provided for illustration only, and aspects of the present invention are not limited to the embodiment illustrated in FIG. 2.

The PWM signal provider 141 provides a PWM signal having the same phase as that of AC power from the electric power system 170. To achieve this, the power grid voltage sensor 146 senses a voltage of the electric power system 170.

The phase information calculator 147 then calculates phase information using a voltage obtained from the power grid voltage sensor 146 and outputs the phase information to the PWM signal provider 141. The PWM signal provider 141 thereafter provides a PWM signal having the same phase as that of AC power from the electric power system 170 based on the phase information output by the phase information calculator 147. In both first and second modes, which will be described below, the PWM signal provider 141 provides a PWM signal having the same phase as that of AC power from the electric power system 170.

The push-pull inverter 142 is electrically connected to the DC link 130, the PWM signal provider 141, and the offset voltage provider 143. In the first mode, for example, the push-pull inverter 142 converts DC power from the DC link 130 into AC power and provides the AC power to the offset voltage provider 143. In the second mode, for example, the push-pull inverter 142 converts AC power from the offset voltage provider 143 into DC power and provides the DC power to the DC link 130.

To accomplish the above described function, the push-pull inverter 142 includes a first switch Q1, a second switch Q2, an inductor L, and a capacitor C.

The first switch Q1 has a first electrode (e.g., drain), a second electrode (e.g., gate), and a third electrode (e.g., source). The first and second electrodes are connected to the DC link 130 and the PWM signal provider 141, respectively. The third electrode is connected to the second switch Q2 and the inductor L. In this case, the first switch Q1 may include a parasitic diode that is forward biased from the third electrode towards the first electrode. The first switch Q1 may be one selected from an N-channel field-effect transistor (FET), an Insulated gate bipolar transistor (IGBT), an NPN-type bipolar transistor, and the equivalents thereof, but aspects of the present invention are not limited thereto.

The second switch Q2 has a first electrode (e.g., drain), a second electrode (e.g., gate), and a third electrode (e.g., source). The first and second electrodes are connected to the third electrode of the first switch Q1 and the PWM signal provider 141, respectively. The third electrode is connected to a ground terminal. In this case, the second switch Q2 may include a parasitic diode that is forward biased from the first electrode towards the third electrode. The second switch Q2 is one selected from a P-channel FET, an IGBT, a PNP-type bipolar transistor, and the equivalents thereof, but aspects of the present invention are not limited thereto.

The push-pull inverter 142 further includes a buffer 142a connected to the second electrode of the first switch Q1, the second electrode of the second switch Q2, and the PWM signal provider 141.

The inductor L has a first electrode connected between the third electrode of the first switch Q1 and the first electrode of the second switch Q2 and a second electrode connected to the offset voltage provider 143. Due to the above configuration, the first and second switches Q1 and Q2 are turned on or off in response to a single common control signal. Thus, the number of control signals can be reduced, and the circuitry can be simplified.

The capacitor C has a first electrode connected between the third electrode of the second switch Q2 and the ground terminal and a second electrode connected between the second electrode of the inductor L and the offset voltage provider 143.

The offset voltage provider 143 is connected between the push-pull inverter 142 and the electric power system 170. In the first mode, for example, the offset voltage provider 143 adds a negative offset voltage to an AC voltage provided by the push-pull inverter 142 and provides the resultant voltage to the electric power system 170. As a result of adding the negative offset voltage, the AC voltage from the push-pull inverter 142 is level-shifted in a negative direction, e.g., by about a half of the AC voltage, and provided to the electric power system 170. In the second mode, for example, the offset voltage provider 143 adds a positive offset voltage to an AC voltage provided by the electric power system 170 and provides the resultant voltage to the push-pull inverter 142. As a result of adding the positive offset voltage, the AC voltage from the electric power system 170 is level-shifted in a positive direction, e.g., by about a half of the voltage, and provided to the push-pull inverter 142.

To accomplish the above described functions, the offset voltage provider 143 includes a first offset voltage provider 144 for supplying power from the push-pull inverter 142 to the electric power system 170 and a second offset voltage provider 145 for supplying power from the electric power system 170 to the push-pull inverter 142.

The first offset voltage provider 144 includes a first offset switch 144a and a first adder 144c. The first offset switch 144a is connected between the push-pull inverter 142 and the first adder 144c. The first adder 144c is connected between the first offset switch 144a and the electric power system 170. The first offset voltage provider 144 further includes a first switch controller 144b for controlling the first offset switch 144a to turn on or off and a first power supply 144d connected to the first adder 144c to provide a negative offset voltage to the first adder 144c. For example, by adding the negative offset voltage, a voltage Vlink of the DC link 130 may be level-shifted in the negative direction, e.g., by one half of the voltage Vlink.

The second offset voltage provider 145 includes a second offset switch 145a and a second adder 145c. The second offset switch 145a is connected between the electric power system 170 and the second adder 145c. The second adder 145c is connected between the second offset switch 145a and the push-pull inverter 142. The second offset voltage provider 145 further includes a second switch controller 145b for controlling the second offset switch 145a to turn on or off and a second power supply 145d connected to the second adder 145c to provide a positive offset voltage to the second adder 145c. For example, by adding the positive offset voltage, a voltage Vgrid of the electric power system 170 may be level-shifted in the positive direction, e.g., by one half of the voltage Vgrid.

The electric power system 170 is electrically connected to the offset voltage provider 143. Although not shown in FIG. 2, a load, a cut-off switch, and a grid connector are connected between the offset voltage provider 143 and the electric power system 170. Further, a resistor and a capacitor may be additionally connected to the electric power system 170, but aspects of the present invention are not limited thereto.

Figure 3:
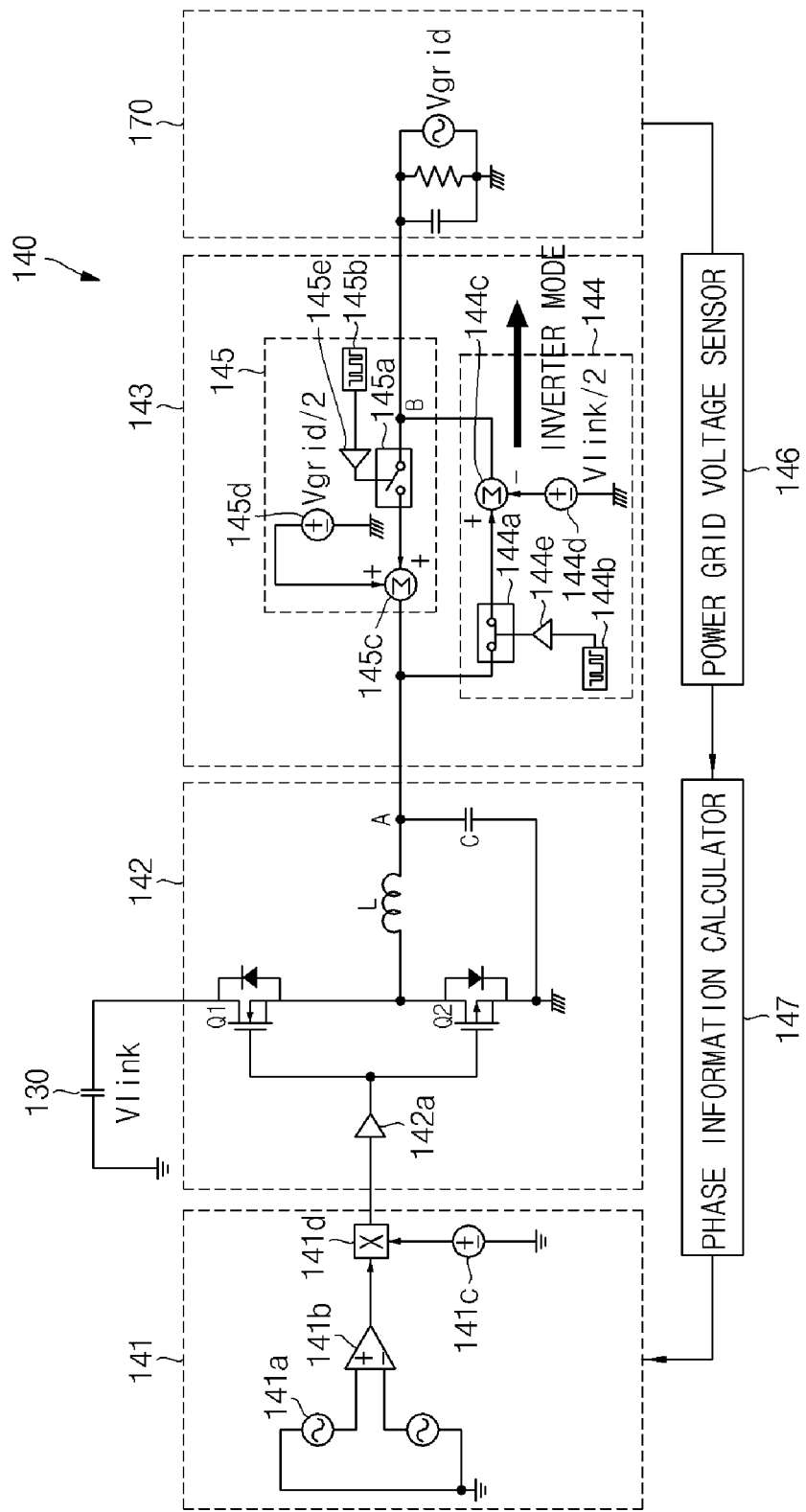
FIG. 3 is a block diagram illustrating a first mode operation of the bidirectional inverter according to an embodiment of the present invention.
Figure 4A:
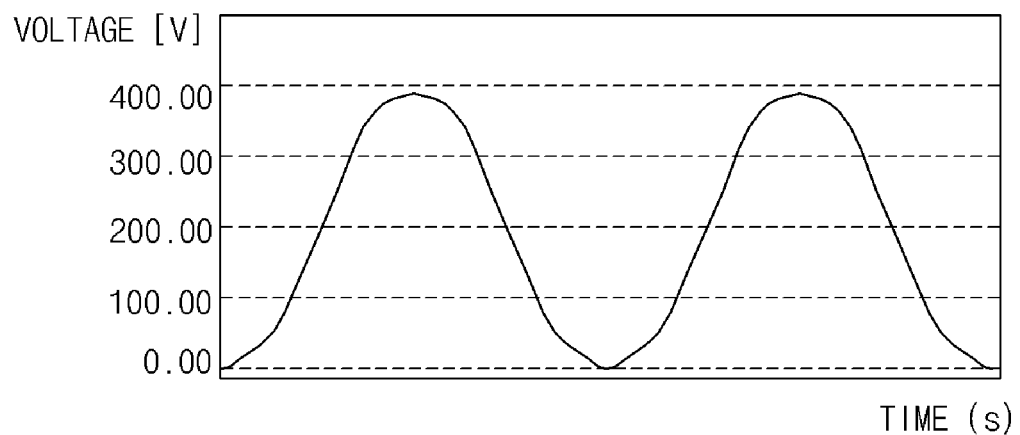
FIGS. 4A and 4B are graphs illustrating variations in the voltage across nodes A and B shown in FIG. 3.
Figure 4B:
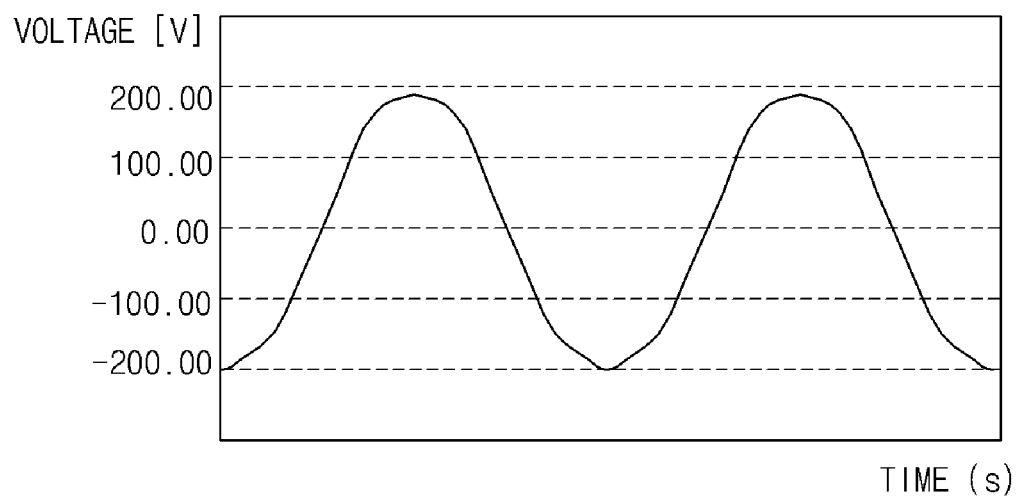

FIG. 3 is a block diagram illustrating a first mode operation of the bidirectional inverter 140 according to an embodiment of the present invention. FIGS. 4A and 4B are graphs illustrating variations in the voltage across nodes A and B shown in FIG. 3.

According to one embodiment, in the first mode, the bidirectional inverter 140 converts DC power from the DC link 130 into AC power and provides the AC power to the electric power system 170. The first mode is also referred to as an inverter mode. In this case, the DC link 130 may be kept charged by power generated by a solar cell or battery.

The power grid voltage sensor 146 senses a voltage of the electric power system 170 and outputs the voltage to the phase information calculator 147. The phase information calculator 147 then calculates phase information using the voltage and provides the phase information to the PWM signal provider 141.

Based on the phase information about the electric power system 170, the PWM signal provider 141 thereafter provides a PWM signal having the same phase as that of the power from the electric power system 170 to the push-pull inverter 142.

The push-pull inverter 142 alternately turns on and off the first and second switches Q1 and Q2 in response to the PWM signal input from the PWM signal provider 141. Then, DC power from the DC link 130 is transferred to a LC filter consisting of the inductor L and the capacitor C and converted into AC power. In this case, the first and second switches Q1 and Q2 may be N and P-channel FETs, respectively. Thus, the first and second switches Q1 and Q2 turn on and off alternately, and not simultaneously.

According to the operation of the push-pull inverter 142, AC power is output to node A of the push-pull inverter 142, as illustrated in FIG. 4A where the y axis (e.g., ordinate) and x axis (e.g., abscissa) represent voltage and time, respectively. Referring to FIG. 4A, AC power of about 0 V to about 400 V is output through the node A.

Subsequently or simultaneously, the offset voltage provider 143, more specifically, the first offset voltage provider 144 starts to operate. First, the first switch controller 144b controls the first offset switch 144a to turn on. Here, the second offset switch 145a remains turned off. The first switch controller 144b may be controlled by a control signal output from the integrated controller 210 (shown in FIG. 1). For example, if the integrated controller 210 recognizes the current mode as the first mode, the integrated controller 210 may issue a command to the first switch controller 144b to turn on the first offset switch 144a.

Turning on the first offset switch 144a causes the nodes A and B to be electrically connected to each other. That is, the push-pull inverter 142 is electrically connected to the electric power system 170.

Here, the first power supply 144d supplies a negative offset voltage to the first adder 144c. Thus, an AC voltage provided by the push-pull inverter 142 is level-shifted in the negative direction by some extent, for example, about one half of the AC voltage, and provided to the electric power system 170. In this way, as illustrated in FIG. 4B, an AC voltage of about −200 V to about 200V can be provided to the electric power system 170 through the node B of the offset voltage provider 143.

Figure 5:
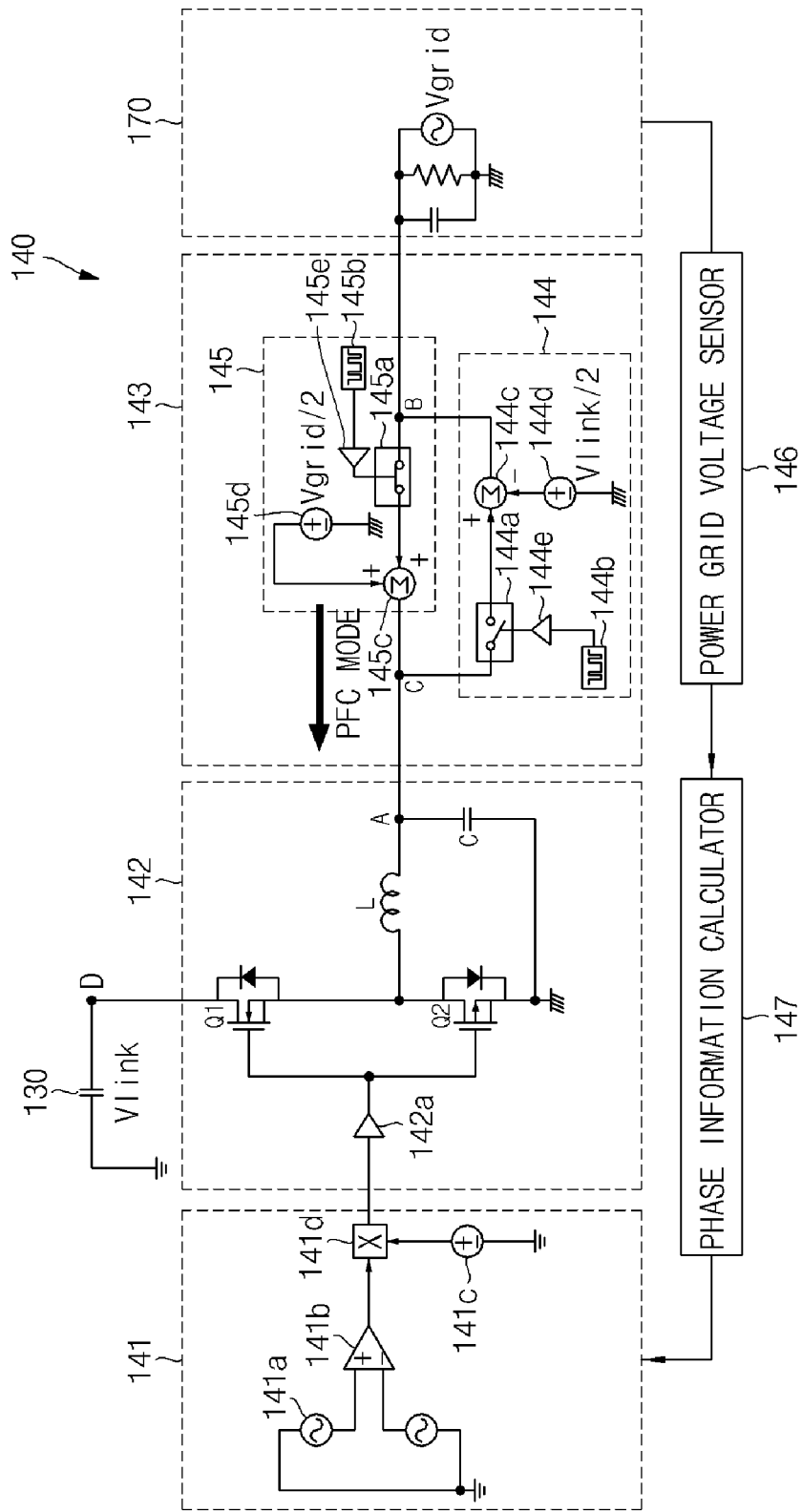
FIG. 5 is a block diagram illustrating a second mode operation of the bidirectional inverter according to an embodiment of the present invention.
Figure 6A:
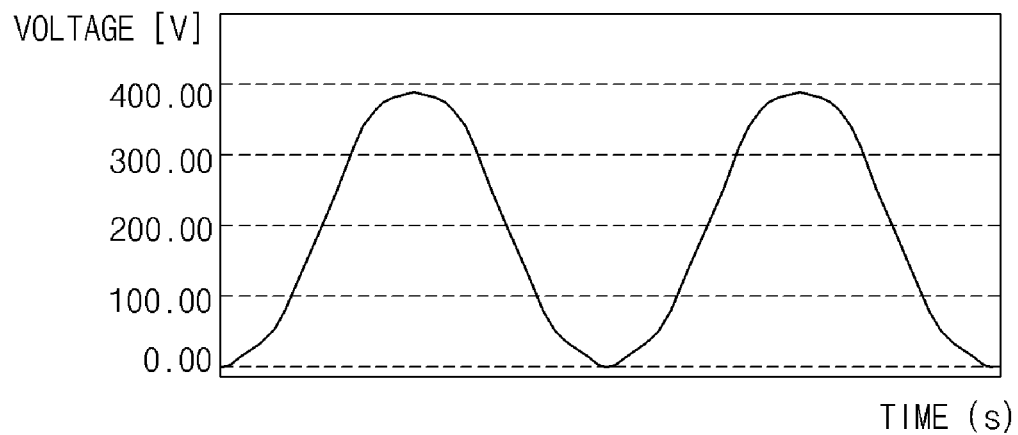
FIGS. 6A and 6B are graphs illustrating variations in the voltage across nodes C and D shown in FIG. 5.
Figure 6B:
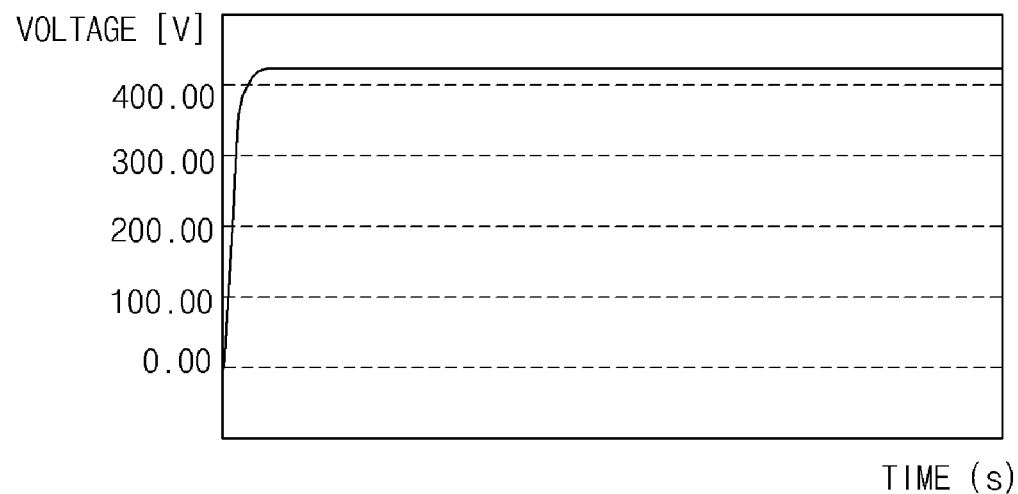

FIG. 5 is a block diagram illustrating a second mode operation of the bidirectional inverter 140 according to an embodiment of the present invention. FIGS. 6A and 6B are graphs illustrating variations in the voltage across nodes C and D shown in FIG. 5.

According to the embodiment of FIG. 5, in the second mode, the bidirectional inverter 140 converts AC power from the electric power system 170 into DC power and provides the DC power to the DC link 130. The second mode is also referred to as a power factor correction (PFC) mode.

First, the offset voltage provider 143, more specifically, the second offset voltage provider 145 starts to operate. The second switch controller 145b controls the second offset switch 145a to turn on. Here, the first offset switch 144a remains turned off. The second switch controller 145b may be controlled by a control signal output from the integrated controller 210 (shown in FIG. 1). For example, if the integrated controller 210 recognizes the current mode as the second mode, the integrated controller 210 may issue a command to the second switch controller 145b to turn on the second offset switch 145a. Turning on the second offset switch 145a causes the push-pull inverter 142 to be electrically connected to the electric power system 170.

The second power supply 145d supplies a positive offset voltage to the second adder 145c. Thus, an AC voltage provided by the electric power system 170 is level-shifted in the positive direction by some extent, for example, about one half of the AC voltage, and provided to the push-pull inverter 142. In this way, as illustrated in FIG. 6A where the y axis (e.g., ordinate) and x axis (e.g., abscissa) represent voltage and time, respectively, an AC voltage of about 0 V to about 400V may be provided to the push-pull inverter 142 through node C of the offset voltage provider 143.

Subsequently or simultaneously, the power grid voltage sensor 146 senses a voltage of the electric power system 170 and outputs the voltage to the phase information calculator 147. The phase information calculator 147 then calculates phase information using the voltage and provides the phase information to the PWM signal provider 141.

Based on the phase information about the electric power system 170, the PWM signal provider 141 thereafter provides a PWM signal having the same phase as that of power from the electric power system 170 to the push-pull inverter 142.

The push-pull inverter 142 alternately turns on and off the first and second switches Q1 and Q2 in response to the PWM signal input from the PWM signal provider 141. Then, power stored in the LC filter consisting of the inductor L and the capacitor C is provided to the DC link 130. In this case, the first and second switches Q1 and Q2 may be N and P-channel FETs, respectively. Thus, the first and second switches Q1 and Q2 turn on and off alternately, and not simultaneously.

According to the operation of the push-pull inverter 142, stable DC power as illustrated in FIG. 6B may be provided. The voltage illustrated in FIG. 6B is substantially equal to a voltage charged in the DC link 130. In FIG. 6B, the y axis (ordinate) and x axis (abscissa) represent voltage and time, respectively. Referring to FIG. 6B, a DC voltage greater than 400V may be provided through node D.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A bidirectional inverter for a renewable energy storage system, the bidirectional inverter being configured to provide power from a direct current (DC) link to an electric power system or to provide power from the electric power system to the DC link, the bidirectional inverter comprising:
   a pulse-width-modulation (PWM) signal provider for providing a PWM signal;
   a push-pull inverter coupled to the PWM signal provider and the DC link; and
   an offset voltage provider coupled to the push-pull inverter and the electric power system, and configured to level-shift an AC input voltage, and
   wherein the offset voltage provider is configured to provide an offset voltage to the electric power system, the offset voltage being a sum of a negative offset voltage and the AC input voltage, wherein the AC input voltage is an AC voltage from the push-pull inverter, and
   wherein the negative offset voltage level-shifts the AC voltage from the push-pull inverter in a negative direction by one half of the AC voltage.

2. The bidirectional inverter of claim 1, wherein the push-pull inverter is configured to convert DC power from the DC link into alternating current (AC) power and provide the AC power to the offset voltage provider, as the AC input voltage.

3. The bidirectional inverter of claim 2, wherein the PWM signal provider is configured to provide the PWM signal having a same phase as that of the electric power system.

4. The bidirectional inverter of claim 1, wherein the push-pull inverter is configured to convert AC power from the offset voltage provider into DC power and provide the DC power to the DC link.

5. The bidirectional inverter of claim 4, wherein the PWM signal provider is configured to provide the PWM signal having a same phase as that of the electric power system.

6. The bidirectional inverter of claim 1, further comprising a voltage sensor for sensing a voltage of the electric power system and a phase information calculator for sensing a phase information using a voltage obtained from the voltage sensor and providing the phase information to the PWM signal provider.

7. The bidirectional inverter of claim 1, wherein the push-pull inverter comprises:
   a first switch having a first electrode coupled to the DC link, a second electrode coupled to the PWM signal provider, and a third electrode;
   a second switch having a first electrode coupled to the third electrode of the first switch, a second electrode coupled to the PWM signal provider, and a third electrode coupled to a ground terminal;
   an inductor having a first electrode coupled to the third electrode of the first switch and the first electrode of the second switch, and a second electrode coupled to the offset voltage provider; and
   a capacitor coupled between the third electrode of the second switch and the second electrode of the inductor.

8. The bidirectional inverter of claim 7, wherein the first switch comprises an N-channel field-effect transistor (FET), and the second switch comprises a P-channel FET.

9. A bidirectional inverter for a renewable energy storage system, the bidirectional inverter being configured to provide power from a direct current (DC) link to an electric power system or to provide power from the electric power system to the DC link, the bidirectional inverter comprising:
   a pulse-width-modulation (PWM) signal provider for providing a PWM signal;
   a push-pull inverter coupled to the PWM signal provider and the DC link; and
   an offset voltage provider coupled to the push-pull inverter and the electric power system, and configured to level-shift an AC input voltage, and
   wherein the offset voltage provider is configured to provide an offset voltage to the push-pull inverter, the offset voltage being a sum of a positive offset voltage and the AC input voltage, wherein the AC input voltage is an AC voltage from the electric power system, and
   wherein the positive offset voltage level-shifts the AC voltage from the electric power system in a positive direction by one half of the AC voltage.

10. The bidirectional inverter of claim 9, wherein the push-pull inverter is configured to convert DC power from the DC link into alternating current (AC) power and provide the AC power to the offset voltage provider, as the AC input voltage.

11. The bidirectional inverter of claim 10, wherein the PWM signal provider is configured to provide the PWM signal having a same phase as that of the electric power system.

12. The bidirectional inverter of claim 9, wherein the push-pull inverter is configured to convert AC power from the offset voltage provider into DC power and provide the DC power to the DC link.

13. The bidirectional inverter of claim 12, wherein the PWM signal provider is configured to provide the PWM signal having a same phase as that of the electric power system.

14. The bidirectional inverter of claim 9, further comprising a voltage sensor for sensing a voltage of the electric power system and a phase information calculator for sensing a phase information using a voltage obtained from the voltage sensor and providing the phase information to the PWM signal provider.

15. The bidirectional inverter of claim 9, wherein the push-pull inverter comprises:
   a first switch having a first electrode coupled to the DC link, a second electrode coupled to the PWM signal provider, and a third electrode;
   a second switch having a first electrode coupled to the third electrode of the first switch, a second electrode coupled to the PWM signal provider, and a third electrode coupled to a ground terminal;
   an inductor having a first electrode coupled to the third electrode of the first switch and the first electrode of the second switch, and a second electrode coupled to the offset voltage provider; and
   a capacitor coupled between the third electrode of the second switch and the second electrode of the inductor.

16. The bidirectional inverter of claim 15, wherein the first switch comprises an N-channel field-effect transistor (FET), and the second switch comprises a P-channel FET.

17. A bidirectional inverter for a renewable energy storage system, the bidirectional inverter being configured to provide power from a direct current (DC) link to an electric power system or to provide power from the electric power system to the DC link, the bidirectional inverter comprising:
   a pulse-width-modulation (PWM) signal provider for providing a PWM signal;
   a push-pull inverter coupled to the PWM signal provider and the DC link; and
   an offset voltage provider coupled to the push-pull inverter and the electric power system, and configured to level-shift an AC input voltage, and wherein the offset voltage provider comprises:
  a first offset voltage provider for supplying power from the push-pull inverter to the electric power system as a first offset voltage; and
  a second offset voltage provider for supplying power from the electric power system to the push-pull inverter as a second offset voltage, and
wherein the first offset voltage provider comprises:
  a first offset switch coupled to the push-pull inverter; and
  a first adder coupled between the first offset switch and the electric power system, the first adder for providing the first offset voltage to the electric power system by adding a negative offset voltage to a voltage supplied from the push-pull inverter.

18. The bidirectional inverter of claim 17, wherein the second offset voltage provider comprises:
  a second offset switch coupled to the electric power system; and
  a second adder coupled between the second offset switch and the push-pull inverter, the second adder being for providing the second offset voltage to the push-pull inverter by adding a positive offset voltage to a voltage supplied from the electric power system.

19. The bidirectional inverter of claim 17, wherein the push-pull inverter is configured to convert DC power from the DC link into alternating current (AC) power and provide the AC power to the offset voltage provider, as the AC input voltage.

20. The bidirectional inverter of claim 17, wherein the push-pull inverter is configured to convert AC power from the offset voltage provider into DC power and provide the DC power to the DC link.

\* \* \* \* \*